(12) United States Patent
Hachiga

(10) Patent No.: US 7,212,126 B2
(45) Date of Patent: May 1, 2007

(54) LOCATION INFORMATION DETECTING METHOD AND SYSTEM

(75) Inventor: Hitoshi Hachiga, Tokyo (JP)

(73) Assignee: Uniden Corporation, Tokyo (JP)

( * ) Notice: Subject to any disclaimer, the term of this patent is extended or adjusted under 35 U.S.C. 154(b) by 140 days.

(21) Appl. No.: 10/993,085

(22) Filed: Nov. 19, 2004

(65) Prior Publication Data

US 2006/0119480 A1     Jun. 8, 2006

(51) Int. Cl.
  *G08B 13/14*  (2006.01)
(52) U.S. Cl. .............. 340/572.8; 340/572.1; 340/572.2; 340/10.1; 375/137
(58) Field of Classification Search ............ 340/572.8, 340/572.1, 572.2, 10.1, 10.33, 10.34, 3.1, 340/3.5, 3.51, 686.1, 572.4; 375/134, 137, 375/211; 455/456.1, 132, 13.1, 24
See application file for complete search history.

(56) References Cited

U.S. PATENT DOCUMENTS

| | | | | |
|---|---|---|---|---|
| 5,920,261 | A * | 7/1999 | Hughes et al. ........... | 340/568.8 |
| 6,157,321 | A * | 12/2000 | Ricci ...................... | 340/902 |
| 6,731,198 | B1 * | 5/2004 | Stobbe et al. ............ | 340/10.33 |
| 7,038,584 | B2 * | 5/2006 | Carter ................... | 340/539.13 |

FOREIGN PATENT DOCUMENTS

| | | |
|---|---|---|
| JP | 10-302038 | 11/1998 |
| JP | 2000-298034 | 10/2000 |
| JP | 2001-059729 | 3/2001 |
| JP | 2001-116583 | 4/2001 |
| JP | 2001-357363 | 12/2001 |
| JP | 2002-116968 | 4/2002 |
| JP | 2002-269508 | 9/2002 |
| JP | 2002-341939 | 11/2002 |
| JP | 2002-342493 | 11/2002 |
| JP | 2004-078603 | 3/2004 |

* cited by examiner

*Primary Examiner*—Davetta W. Goins
(74) *Attorney, Agent, or Firm*—Steven J. Hultquist; Intellectual Property Technology Law

(57) ABSTRACT

A method and system for detecting information relating to the location of a radio IC tag, using an interrogator unit. In one implementation of such method and system, a radio IC tag is securely attached to a fixed object, and a mobile object that has an interrogator unit moves into communication range with the radio IC tag. As the interrogator unit sends radio waves to the radio IC tag, the radio IC tag existing in the communication range sends reflected waves to the interrogator unit. When the interrogator unit receives the reflected waves, it detects and demodulates the reflected waves. The interrogator unit then reads information relating to the location of the radio IC tag as the information stored in the radio IC tag.

5 Claims, 2 Drawing Sheets

[Fig.1]
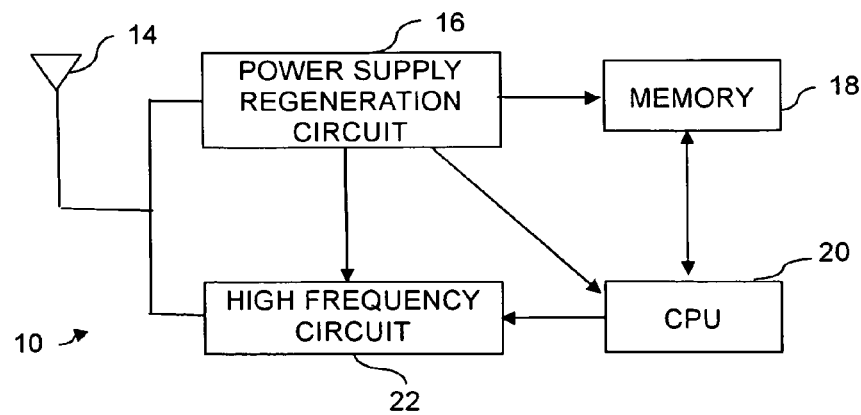
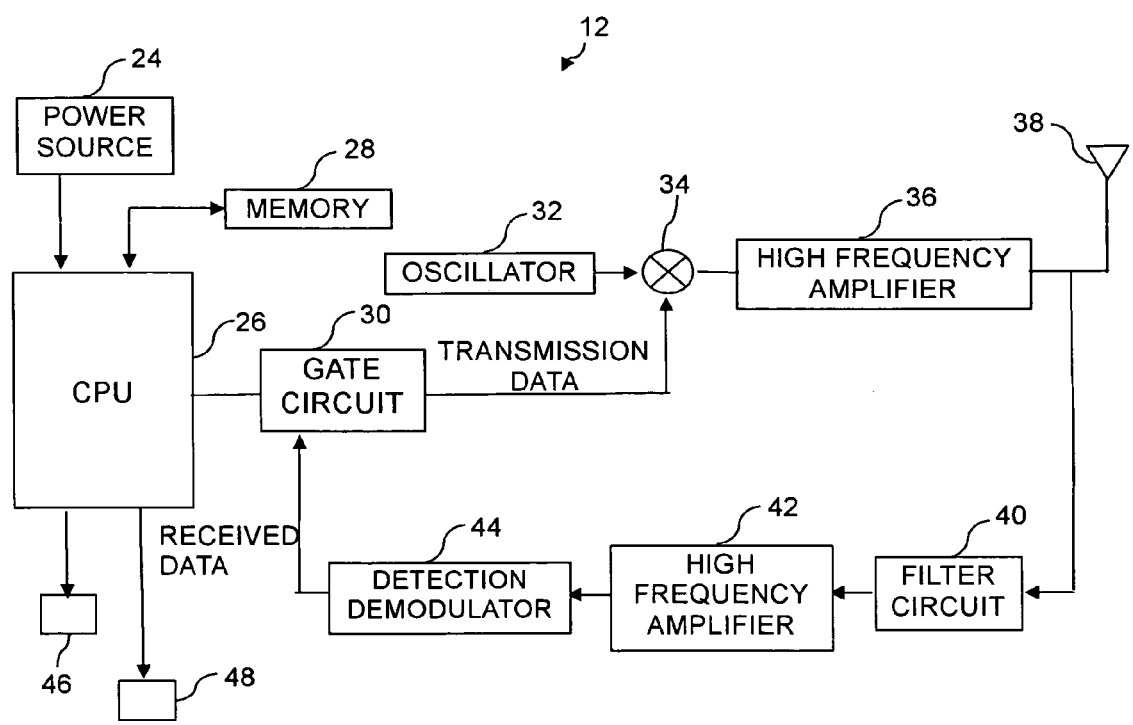

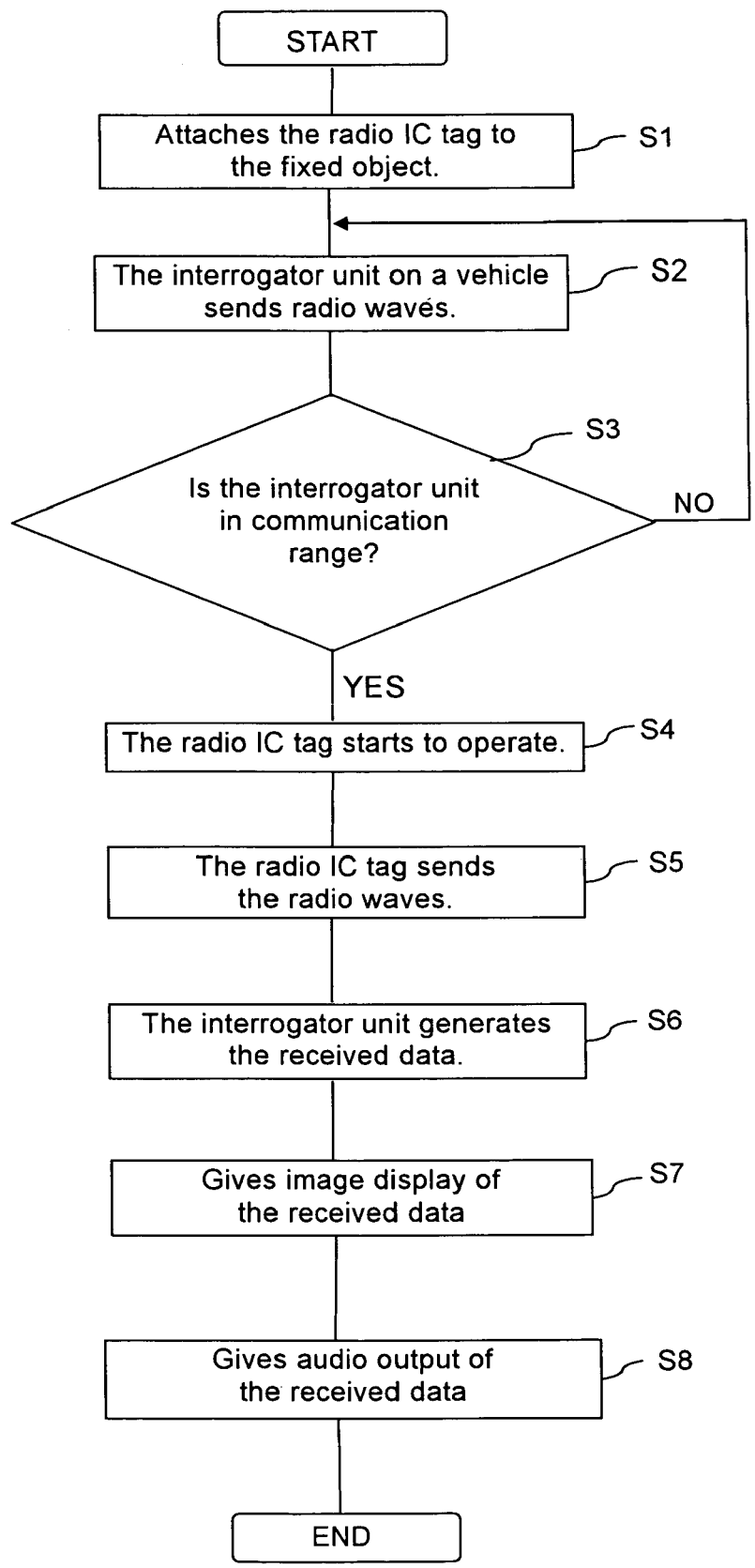
[Fig. 2]

LOCATION INFORMATION DETECTING METHOD AND SYSTEM

BACKGROUND

The present invention relates to a location information detecting method and system by which location information is detected by means of communications between a radio IC tag and an interrogator unit.

There is a known system for establishing communications between a radio IC tag and an interrogator unit by using radio frequencies, in for example, the short wavelength region or the ultra short wavelength region, in which a radio IC tag (RFID) is attached to the surface of an article, and an interrogator unit is used to read information stored in the radio IC tag by moving the article close to the interrogator unit. (See Japanese Patent Laid-Open (Kokai) Publication No. 2001-357363). By determining whether an article has passed by the interrogator unit or not, this type of system can manage the distribution and inventory status of goods based on the information read by the interrogator unit.

Moreover, by attaching the radio IC tag to an identification card (such as an access permit) carried by a person and having the interrogator unit read the information stored in the radio IC tag when the person enters or leaves a specified place, it is possible to apply the system to the management of the person's access status and to the detection of the person's movements.

In the system of Japanese Patent Laid-Open (Kokai) Publication No. 2001-357363 (p.p. 2–3 and FIG. 1), the radio IC tag is attached to the article and the interrogator unit is fixed at a specified location. Therefore, even if the interrogator unit reads the information stored in the radio IC tag, it is impossible to detect information relating to the location of the radio IC tag.

It would be a significant advance in the art to detect the information relating to the location of the radio IC tag, using the interrogator unit.

SUMMARY

The present invention relates in one aspect to a location information detecting method for reading information stored in a radio IC tag, using an interrogator unit, where when a mobile object which has the interrogator unit moves into communication range with the radio IC tag, the interrogator unit sends radio waves to the radio IC tag; and wherein the radio IC tag, which is securely attached to the fixed object, stores information relating to the location of the fixed object and sends the stored information upon receiving a power supply from the received radio signal.

By such method, the radio IC tag is securely attached to the fixed object; and when a mobile object with the interrogator unit moves into communication range with the radio IC tag, the interrogator unit then sends radio signals to the radio IC tag and reads the information stored in the radio IC tag. Accordingly, it is possible to use the interrogator unit to detect information relating to the location of the radio IC tag.

The present invention relates in another aspect to a location information detecting system including: a radio IC tag that is attached to a fixed object, stores information relating to the location of the fixed object and sends the stored information upon receiving a power supply from the received radio signal; an interrogator unit that is attached to a mobile object, sends radio waves, and reads information stored on the radio IC tag through communication with the radio IC tag existing in communication range.

In the above-described system, the radio IC tag that stores information relating to the location of the fixed object is attached to the fixed object and is located at a specified location, and the interrogator unit is designed to read the information stored in the radio IC tag by means of communication between the radio IC tag and the interrogator unit when the mobile object with the interrogator unit moves and enters the communication range of the radio IC tag. Therefore, it is possible to use the interrogator unit to detect information relating to the location of the radio IC tag.

This invention can detect the information relating to the location of the radio IC tag, using the interrogator unit.

DESCRIPTION OF DRAWINGS

FIG. 1 is a block diagram of the location information detecting system according to one embodiment of this invention.

FIG. 2 is a flowchart that explains the working of the location information detecting system according to one embodiment of the invention.

DETAILED DESCRIPTION

An embodiment of this invention is described below with reference to the attached drawings. FIG. 1 is a block diagram of the location information detecting system according to one embodiment of this invention.

Referring to FIG. 1, the location information detecting system comprises a radio IC (Integrated Circuit) tag 10 and an interrogator unit 12. The radio IC tag 10 is attached to a fixed object such as an electric pole, building, or tree. The interrogator unit 2 is retained by a mobile object such as a person or a vehicle.

The radio IC tag 10 serves as responder or radio frequency identification (RFID) and is composed of for example, an antenna 14, a power supply regeneration circuit 16, a memory 18, a CPU 20, and a high frequency circuit 22. The antenna 14 receives radio waves from the interrogator unit 12, outputs the received waves to the power supply regeneration circuit 16, and sends, as reflected waves, radio waves of high frequency—the output of the high frequency circuit 22. The power supply regeneration circuit 16 rectifies a part of the carrier waves (for example, 13.56 MHz carrier waves when the received radio waves are of a short wavelength) out of the radio waves received by the antenna 14 to regenerate the direct-current power supply, and outputs the regenerated direct-current power supply to the memory 18, the CPU 20, and the high frequency circuit 22, thereby activating each component. The memory 18 stores various kinds of information relating to the location of the fixed object, such as the address, place name, and name of the fixed object, and also stores map information according to a map based on the World Geodetic System, as location information about the fixed object on the map. In addition to the various information relating to the location of the fixed object, the memory 18 further stores navigation information.

The CPU 20 is composed of for example, a microcomputer. The CPU 20 starts to operate when it receives the direct-current power supply from the power supply regeneration circuit 16. The CPU 20 sequentially reads the information stored in the memory 18, and then functions as a modulating means to modulate the received carrier waves (13.56 MHz) according to the information that it has read, for example, location information relating to the location of the fixed object, and to output the modulated carrier waves to the high frequency circuit 22. The high frequency circuit 22 amplifies high frequency signals, including the modulated carrier waves, and sends from the antenna 14 the amplified high frequency signals as reflected radio waves. Specifically speaking, when switching is conducted to shunt or open a transmission line terminal connected to the antenna 14 in accordance with the location information relating to the location of the fixed object, in-phase carrier waves are generated at the transmission line terminal when it is opened. On the other hand, when the line termination is shunted, the carrier waves are totally reflected as negative phase signals at the line termination and it is thereby possible to send the received carrier waves as reflected waves.

The interrogator unit 12 includes, for example, a power source 24, a CPU 26, a memory 28, a gate circuit 30, an oscillator 32, a modulator 34, a high frequency amplifier 36, an antenna 38, a filter circuit 40, a high frequency amplifier 42, a detection demodulator 44, an display unit 46, and an audio output unit 48. The power source 24 supplies direct-current power to each component.

The CPU 26 is configured as an operation means to perform various kinds of operations based on the received data, from the gate circuit 30, and process programs, and to output the transmission data according to the operation results via the gate circuit 30 to the modulator 34. The modulator 34 receives the carrier waves, for example, carrier wave signals of 13.56 MHz, from the oscillator 32. The modulator 34 is designed for example, to perform amplitude modulation (amplitude shift keying—ASK) of the carrier waves, using the transmission data, and to output the carrier waves, which have undergone ASK, as high frequency signals to the high frequency circuit 36. The high frequency circuit 36 amplifies the high frequency signals and sends the amplified high frequency signals as radio waves from the antenna 38.

The antenna 38 sends and also receives the radio waves and outputs the received radio waves to the filter circuit 40. The filter circuit 40 lets only the high frequency radio waves within the receiving band received by the antenna 38 to pass and be outputted to the high frequency circuit 42. The high frequency circuit 42 amplifies the high frequency signals and outputs the amplified high frequency signals to the detection demodulator 44. The detection demodulator 44 detects the high frequency signals from the high frequency circuit 42, demodulates them as the received data, and outputs the demodulated received data via the gate circuit 30 to the CPU 26.

The CPU 26 handles the received data as information read from the radio IC tag 10, causes the content of the information to be displayed on the screen of the display unit 46, and has the audio output unit 48 give the audio output content of the information.

The CPU 26 also functions as a controller, calculating the distance between the interrogator unit 12 and the radio IC tag 10 based on the received data and outputting control commands to the high frequency amplifier circuit 36 in order to control the electric power to send the radio carrier waves based on the calculation result and according to the distance between the interrogator unit 12 and the radio IC tag 10.

The working of the location information detecting system according to this invention is described below with reference to the flowchart of FIG. 2. Firstly, location information relating to the locations of specified fixed objects is stored (or recorded) respectively on the memories 18 of a plurality of the radio IC tags 10, and each radio IC tag 10 is attached to its respective specified fixed object (step S1).

The interrogator unit 12 is then attached to the mobile object such as a vehicle. When the vehicle runs, the transmit data is generated at the CPU 26; the generated transmission data is outputted via the gate circuit 30 to the modulator 34; the modulator 34 performs amplitude modulation (amplitude shift keying—ASK) of the carrier waves outputted from the oscillator 32, using the transmission data; the carrier waves that have undergone ASK are outputted as high frequency signals to the high frequency circuit 36; the high frequency circuit 36 amplifies the high frequency signals; and the antenna 38 then sends the amplified high frequency signals as radio waves (step S2).

When the vehicle runs and the interrogator unit 12 enters the communication range of any of the radio IC tags 10 (step S3), the antenna 14 of the radio IC tag 10 within communication range receives the radio waves sent from the interrogator unit 12. When the resulting carrier waves are rectified at the power supply regeneration circuit 16, a direct-current power supply is generated from the carrier waves, thereby activating each component of the radio IC tag 10 (step S4).

As each component of the radio IC tag 10 starts to operate, the CPU 20 generates carrier waves (13.56 MHz), sequentially reads the information stored on the memory 18, modulates the carrier waves according to the information it has read, for example, location information relating to the location of the fixed object, and outputs the modulated carrier waves to the high frequency circuit 22. When high frequency signals including the modulated carrier waves are amplified at the high frequency circuit 22, the antenna 14 sends the amplified high frequency signals as reflected radio waves (step S5).

When the antenna 38 receives the reflected radio waves from the radio IC tag 10, only the high frequency radio waves received by the antenna 38 pass through the filter circuit 40 and are outputted to the high frequency circuit 42. These high frequency signals are amplified at the high frequency circuit 42 and are then outputted to the detection demodulator 44. When the amplified high frequency signals are detected and demodulated as received data at the detection demodulator 44, the demodulated receive data is outputted via the gate circuit 30 to the CPU 26, and the CPU 26 performs the processing of the received data (step S6). When the CPU 26 handles the received data as information it has read from the radio IC tag 10, the content of the information that has been read is displayed on the screen of the display unit 46 (step S7) and the audio output unit 48 gives the audio output content of the information (step S8).

According to this embodiment, the radio IC tag 10 that stores information relating to the location of the fixed object is attached to the fixed object and is located at a specified location, and the interrogator unit is designed to read the information recorded on the radio IC tag by means of communication between the radio IC tag 10 and the interrogator unit 12 when the mobile object with the interrogator unit 12 moves and enters the communication range of the interrogator unit 12 and the radio IC tag 10. Accordingly, it is possible to use the interrogator unit 12 to detect the information relating to the location of the radio IC tag 10.

Moreover, according to this embodiment, by attaching the radio IC tag 10 to a fixed object such as an electric pole, a building, or a tree, it is possible to detect and collect the information relating to the location of the fixed object when the vehicle passes near the fixed object even where a location detecting system such as a GPS does not work. Furthermore, by recording on the fixed object various kinds of information relating to the location of the fixed object as well as navigation guide information, it is possible to detect and collect various kinds of information relating to the location of the fixed object and navigation guide information when the vehicle passes near the fixed object.

According to this embodiment, it is also possible to display the content of the information read by the interrogator unit 12 on the screen of the display unit 46 and to cause the audio output unit 48 to give the audio output of the content information.

Moreover, if a plurality of radio IC tags 10 are located close to each other, it is possible to reduce interference between them by locating double-channel radio IC tags alternately and having the interrogator unit 12 send double-channel carrier waves, and receive and process the reflected waves accordingly.

While the invention has been described herein with reference to illustrative features and embodiments, other variations, modifications and alternative embodiments of the invention will readily suggest themselves to those of ordinary skill in the art based on the disclosure herein, and therefore are to be regarded as being within the spirit and scope of the invention.

I claim:

1. A location information detecting system comprising:
   a plurality of radio IC tags, wherein each radio IC tag is attached to a fixed object, stores information relating to the location of the fixed object, and sends the stored information upon receiving a power supply from received radio waves; and
   an interrogator unit that is attached to a mobile object, sends radio waves, and reads information stored on the radio IC tag by communication with the radio IC tag existing in a communication range, said interrogator unit comprising a controller for controlling electric power to send carrier radio waves in accordance with distance between the interrogator unit and the radio IC tag,
   wherein the radio IC tags are comprised of double-channel IC tags as the radio IC tags located alternately and closely to each other, and
   wherein the interrogator unit sends double-channel carrier waves and receives reflected waves of each frequency.

2. The location information detecting system according to claim 1, wherein the information stored in the radio IC tag contains at least one of the address, place name, and name of the fixed object.

3. The location information detecting system according to claim 1, wherein the information stored in the radio IC tag contains map information according to a map based on the World Geodetic System, as location information about the fixed object on the map.

4. The location information detecting system according to claim 2, wherein the information stored in the radio IC tag contains various kinds of information relating to the location of the fixed object, and navigation guide information.

5. The location information detecting system according to claim 1, wherein the interrogator unit comprises: an display unit for displaying the information that has been read; and an audio output unit for audio output of the information that has been read.

* * * * *